(12) United States Patent
Larson

(10) Patent No.: US 9,339,009 B1
(45) Date of Patent: May 17, 2016

(54) SPRAYING AND FEEDING STATION

(75) Inventor: Roger Larson, White Bear Lake, MN (US)

(73) Assignee: Lift and Store LLC, St. Paul, MN (US)

( * ) Notice: Subject to any disclaimer, the term of this patent is extended or adjusted under 35 U.S.C. 154(b) by 467 days.

(21) Appl. No.: 13/374,977

(22) Filed: Jan. 26, 2012

Related U.S. Application Data

(60) Provisional application No. 61/462,044, filed on Jan. 26, 2011.

(51) Int. Cl.
| *A01K 13/00* | (2006.01) |
| *A01K 5/015* | (2006.01) |
| *A61D 7/00*  | (2006.01) |

(52) U.S. Cl.
CPC .............. *A01K 13/003* (2013.01); *A01K 5/015* (2013.01); *A61D 7/00* (2013.01)

(58) Field of Classification Search
CPC ....... A01K 13/00; A01K 5/00; A01K 13/003; A01K 13/001; A01K 13/004; A01K 39/00; A01K 5/015; A61D 7/00
USPC ......... 119/650, 656, 657, 658, 659, 665, 666, 119/671, 51.01, 51.03, 51.5, 58, 60, 61.1, 119/61.3; 43/124, 132.1; 74/650, 656, 657, 74/658, 659, 665, 666, 671
See application file for complete search history.

(56) References Cited

U.S. PATENT DOCUMENTS

| 3,032,011 | A | * | 5/1962  | Stramel ........................ 119/613 |
| 3,137,274 | A | * | 6/1964  | Palmer ................. A01K 5/0114 119/657 |
| 3,831,559 | A | * | 8/1974  | Hinrichs ............... A01K 13/004 119/657 |
| 3,870,023 | A | * | 3/1975  | Wilson ......................... 119/666 |
| 3,941,096 | A | * | 3/1976  | Mann ........................... 119/657 |
| 3,949,709 | A | * | 4/1976  | Myers .......................... 119/667 |
| 4,567,856 | A | * | 2/1986  | Sorenson ....................... 119/666 |
| 4,580,529 | A | * | 4/1986  | Wilson ......................... 119/651 |
| 5,988,113 | A | * | 11/1999 | Zhioua et al. .................. 119/666 |
| 6,230,660 | B1 |  | 5/2001  | Greeson |
| 6,443,164 | B1 | * | 9/2002  | Parker et al. .................. 132/333 |
| 6,615,769 | B2 | * | 9/2003  | Zhioua ......................... 119/666 |
| 6,651,589 | B2 |  | 11/2003 | Greeson |
| 6,966,276 | B2 |  | 11/2005 | Dollar |
| 7,198,008 | B2 | * | 4/2007  | Poyner ......................... 119/712 |
| 7,278,375 | B2 | * | 10/2007 | Ross et al. .................... 119/719 |
| 8,137,615 | B2 | * | 3/2012  | Van Hooser .................... 422/28 |
| 2005/0115515 | A1 | * | 6/2005 | Dollar ......................... 119/667 |
| 2005/0166852 | A1 | * | 8/2005 | Santa Cruz et al. .......... 119/51.03 |
| 2008/0053379 | A1 | * | 3/2008 | Markewitz ..................... 119/600 |
| 2008/0195064 | A1 | * | 8/2008 | Correa et al. .................. 604/289 |
| 2009/0078665 | A1 | * | 3/2009 | Sandusky et al. .............. 211/208 |

* cited by examiner

*Primary Examiner* — Son T Nguyen
*Assistant Examiner* — Thien Thanh Pham
(74) *Attorney, Agent, or Firm* — Eggink & Eggink; Anthony G. Eggink; Katrina M. Eggink

(57) ABSTRACT

A movable spraying and feeding station having a free standing frame structure. A spraying hood structure and a feed holder are mounted to the frame structure. A motion sensor and spray nozzles are mounted on the spraying hood structure. A housing is mounted to the frame structure for the insecticide reservoir, a pumping assembly, a timing circuit, as well as a battery which is charged by a solar panel mounted on the top of the frame structure.

18 Claims, 5 Drawing Sheets

US 9,339,009 B1

SPRAYING AND FEEDING STATION

This application claims the benefit of U.S. Provisional Application Ser. No. 61/462,044, filed Jan. 26, 2011, the entirety of which is incorporated by reference herein.

BACKGROUND OF THE INVENTION

The present invention relates generally to a spraying and feeding station. Particularly, the present invention relates to an insecticide spraying and mineral feeding station for animals such as cattle, cows, calves, horses and the like. More particularly, the invention relates to a portable and adjustable assembly for simultaneously feeding minerals and the automatic spraying of an insecticide to kill back and face flies on beef and dairy cattle and other animals.

The detrimental effect of back and face flies and other insects on the health and well being of cattle, cows, etc. is well known. Various means to deal with these insect problems have been proposed, such as the inclusion of various chemical compositions in animal food and the separate spraying of animals with various insecticides. These prior art solutions have been costly, time consuming and often ineffective in providing an economical means to eliminate this longstanding detriment to the health and well being of cattle, cows, calves, horses, etc. The spraying and feeding station of the present invention provides an assembly which is portable, adjustable, self contained and which automatically applies an insecticide to animals out in the pasture and which overcomes the problems, ineffectiveness and shortcomings of the prior art.

SUMMARY OF THE INVENTION

A portable spraying and feeding station for animals in a pasture, for example. The station is easily assembled, movable and adjustable to accommodate different size animals such as cows, cattle, calves, horses, etc. The station has a frame structure which includes a base with a plurality of legs and an upright stub for mounting the vertical support member of the frame structure.

A spraying hood structure is adjustably mounted to the vertical support member and has a top cover member and flexible curtains attached about its periphery to protect the animals underneath and to permit the controlled spraying of a predetermined volume of insecticide. A feed holder is mounted to the vertical support member of the frame structure and is constructed to hold a mineral block, for example, to thereby position animals underneath the spraying hood structure when feeding.

The underside surface of the top cover member of the spraying hood structure has a sensor, i.e., an IR (infrared) motion sensor and at least one spray nozzle, i.e., two nozzles, one directed to the face area of the animal and the other directed to the shoulder area of the animal. The hood structure may also have housing extensions with spray nozzles to direct insecticide spray to other areas of the animal. As the motion sensor detects the entry of the animal into the spraying hood structure, the spray nozzles are activated for a predetermined time period to thereby treat the animals as they are obtaining minerals from the mineral block positioned in the feed holder structure.

A housing structure is mounted to the rear of the vertical support member and which has an openable and preferably lockable cover or lid. The interior of the housing structure contains the reservoir for the insecticide, a power supply, a pump assembly and a timing circuit for activating the pump and to control the spray time as well as the delay time between spray applications.

A solar panel is mounted to the top of the vertical support member of the frame structure and is in electrical communication with the power supply in the housing structure. The power supply may be a 12 volt battery, for example, which is charged by the solar panel so that the spraying and feeding station of the invention may be placed anywhere in a pasture where the cattle are grazing, for example. The housing structure may also have a pair of slots disposed at its bottom to receive the forks of a forklift to allow the insecticide and feeding station to be easily transported to a desired location.

The spraying and feeding station has tubing which extends from the reservoir in the housing to the spray nozzles and a U-shaped vertical tubular structure may also be provided adjacent the vertical support member to contain the wiring, tubing, etc., so as to provide a protective structure for the electrical and fluid conduits utilized in the station assembly of the invention.

These and other benefits and advantages of this invention will become clear from the following description by reference to the drawings.

DETAILED DESCRIPTION OF THE PREFERRED EMBODIMENTS

Figure 1:
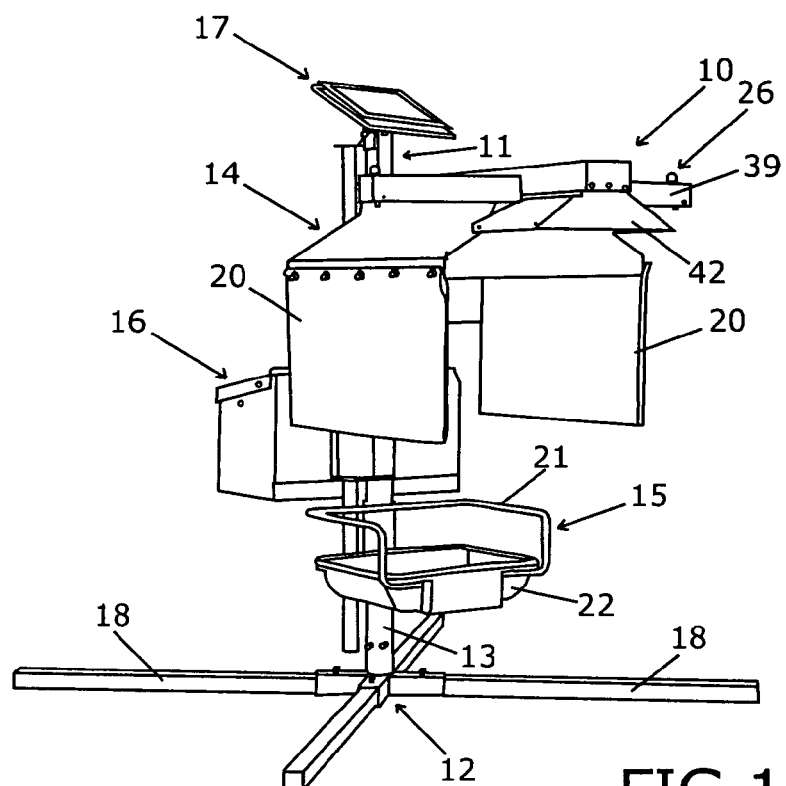
FIG. 1 is a perspective view showing the spraying and feeding station of the present invention.
Figure 2:
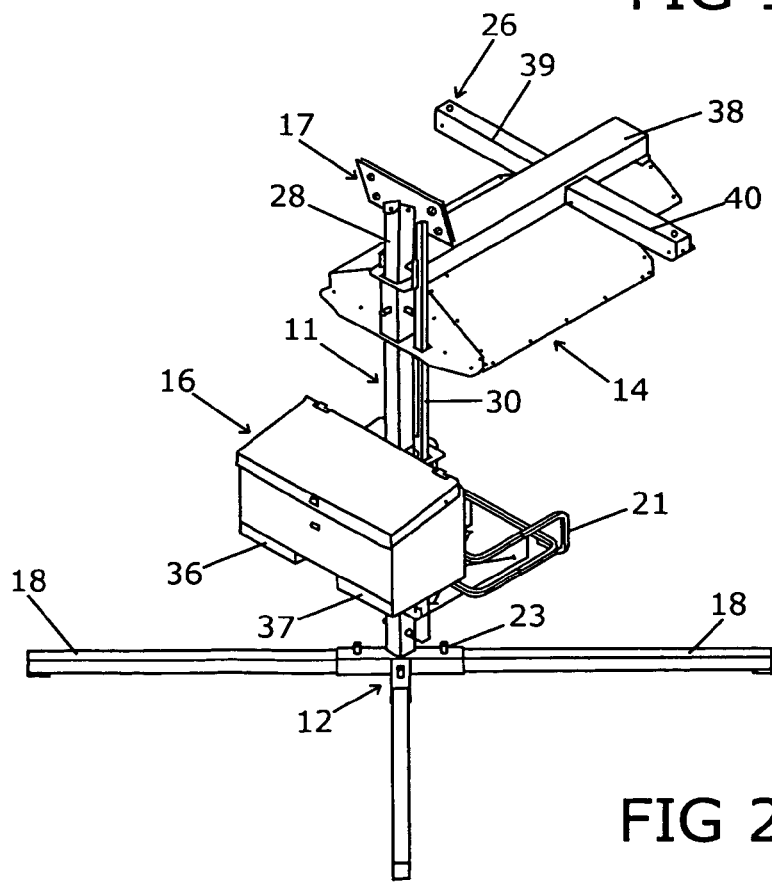
FIG. 2 is a perspective view showing the cooperating elements of the spraying and feeding station of FIG. 1.

Referring to FIGS. 1 and 2, the spraying and feeding station 10 of the present invention is shown having a free standing frame structure 11 with an inverted T-shaped base or base support 12 constructed to hold vertical support member 13 and opposing leg extensions or members 18. The frame structure 12 is preferably constructed of a heavy metallic material so that the station 10 has the integrity and weight to withstand contact with cattle and like animals. The opposing leg extension members 18 are shown secured within the openings of base 12 by means of bolts 23. The leg members 18 have terminal ends which are preferably capped or may have downwardly disposed tips to dig into the ground for stabilization. As shown in the drawings, the four opposing leg members 18 extend outwardly from the base support 12 at approximately right angles with respect to each other and thereby form four quadrants with respect to and below the elements mounted to the vertical support member 13.

As further shown, a solar panel 17 is mounted on the top of the vertical support member 13 and a spray hood structure 14, housing structure 16 and a feed holder 15 are further shown mounted to the vertical support member 13. The spray hood structure 14 and feed holder 15 are shown mounted to the support member 13 and opposite the housing structure 16 so as to spatially extend above and within the opposite quadrants formed by the four opposing leg member 18 to provide access within the spraying and feeding station or assembly 10. The utilization of various brackets and bolts, the various elements of the spraying and feeding station 10 are fully adjustable with respect to the vertical support member 13 so as to accommodate any size animal, i.e., the height of beef and dairy cattle, horses, etc. For example, a height of approximately 64 inches of the hood structure 14 from the ground has been found suitable for most beef cattle breeds as well as a height of approximately 18 inches of the feed holder 15 from the ground.

Figure 9:
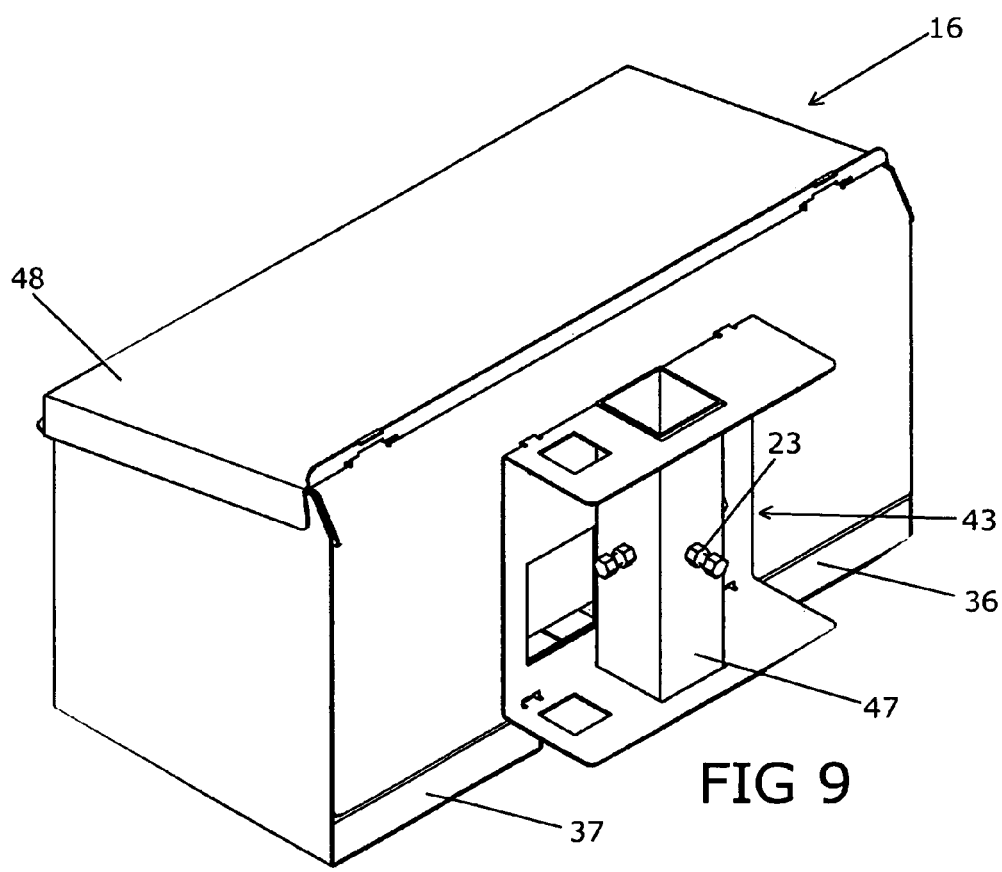
FIG. 9 is a perspective view showing the containment housing of the invention.

Referring to FIGS. 2 and 9, the housing 16 is shown to have bottom slots 36 and 37 which are constructed to receive the forks of a forklift so that the spraying and feeding station 10 may be easily transported to a desired location for annual use. The housing 16 has a tubular attachment structure 43 with a mounting tube 47 to secure the housing 16 for mounting to the vertical support 13 by means of bolts 23, for example. The housing structure 16 has a top or cover 48 to allow access thereinto and preferably is lockable so as to prevent access.

Figure 8:
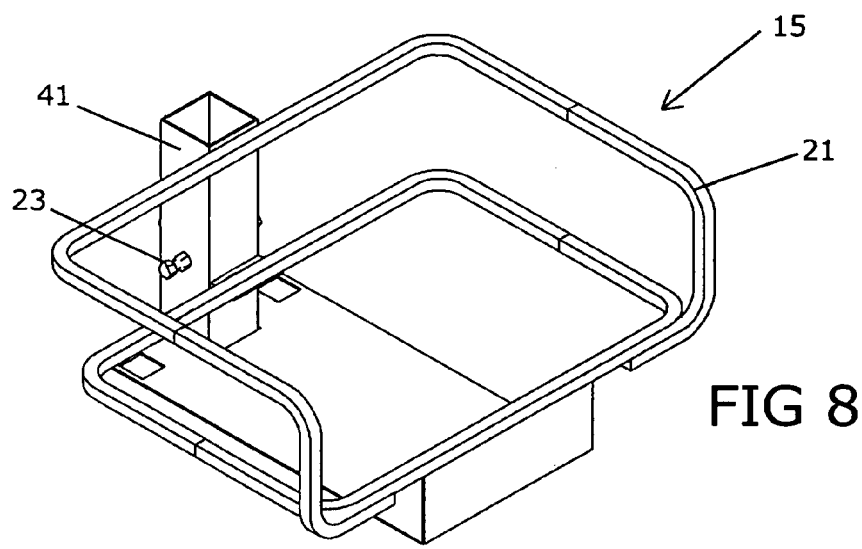
FIG. 8 is a perspective view showing the feed holder support structure of the spraying station.

Referring further to FIG. 8, the feed holder 15 is shown comprised of a generally rectangular frame structure 21 within which tub 22 is positioned as shown in FIG. 1. The feed holder 15 is secured to the vertical support 13 of the frame structure 11 by means of mounting tube 41 and cooperating bolts 23, for example. The tub 22 is adapted to receive a mineral block which provides the necessary minerals to cattle, cows, etc. and which these animals are accustomed to engage on at least a weekly basis. The utilization of the mineral block allows for the spraying and feeding station 10 of the invention to provide a dual function for beef and dairy cattle, for example. The controlled mineral feeding and insecticide spraying provides a dual benefit to these animals.

As shown, the structure of the spray hood 14 with respect to the feed holder 15 allows animals to approach the station 10 from any direction to underneath the hood so that the spray nozzles can effectively treat the animals with insecticide. Further, the flexible curtains 20, as shown in FIG. 1, which hang down from the rigid, hood top 19 protects the spray mist ejected from the spray nozzles from wind and other inclement weather.

Figure 7:
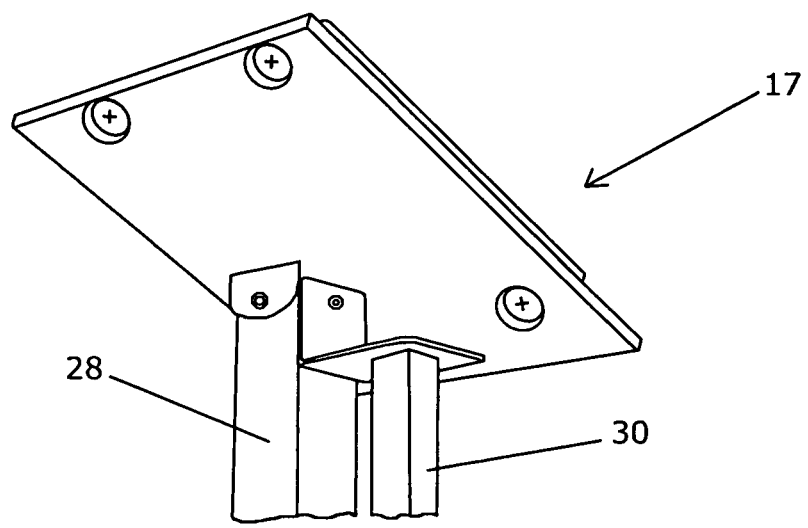
FIG. 7 is a perspective view showing the cap mount and solar panel of the spraying and feeding station of the invention.

FIG. 7 shows cap mount 28 positioned on top of vertical support member 13. Solar panel 17 is shown held by the cap mount 28. Solar panel 17 is positioned at an angle to receive solar energy which is transmitted to the battery for charging purposes. Further shown is the channel member 30 which permits wire 29 to be protected as it extends downwardly form the solar panel 17 to the housing 16. Hose 24 (not shown) extends from channel member 30 and extends through hood 19 so as to provide insecticide to the spray hood structure 14.

Figure 3:
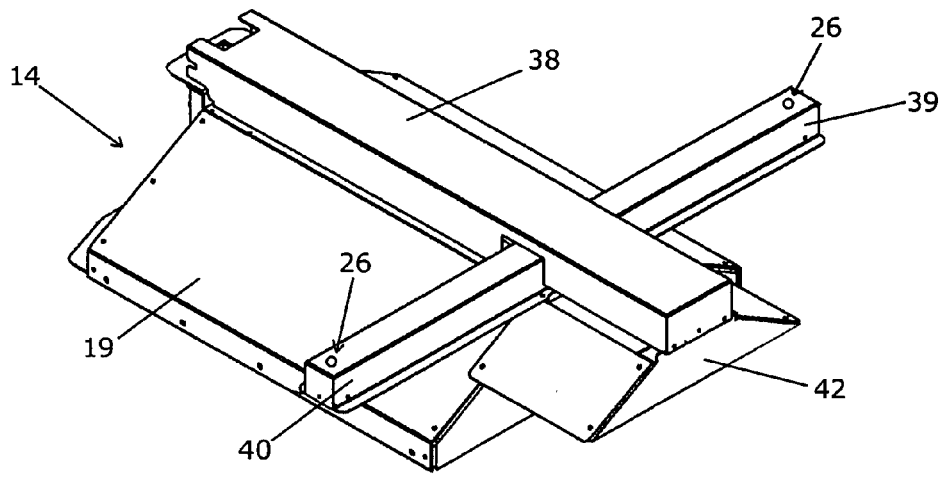
FIG. 3 is a top perspective view showing the spray hood structure of the spraying and feeding station of the invention.

Referring further to FIGS. 1 and 3, the spray hood assembly 14 is shown to have lateral housings 39 and 40 extending from the housing top member 38 as well as a frontal hood structure 42. The lateral housings 39 and 40 further show spray nozzle structures 26 mounted at the terminal ends thereof. Spray nozzle structures 26 are further shown in FIGS. 4 and 5 and a spray nozzle is also positioned under frontal hood structure 42. The spray nozzle arrangement is provided to adequately cover the body of the animal at the spraying and feeding station 10.

Figure 4:
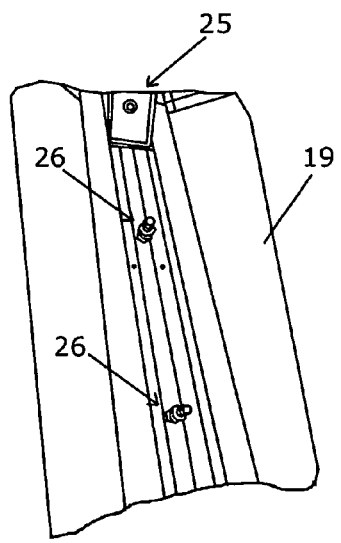
FIG. 4 is a perspective view showing the motion sensor and spray nozzles of the spraying and feeding station of the invention.
Figure 5:
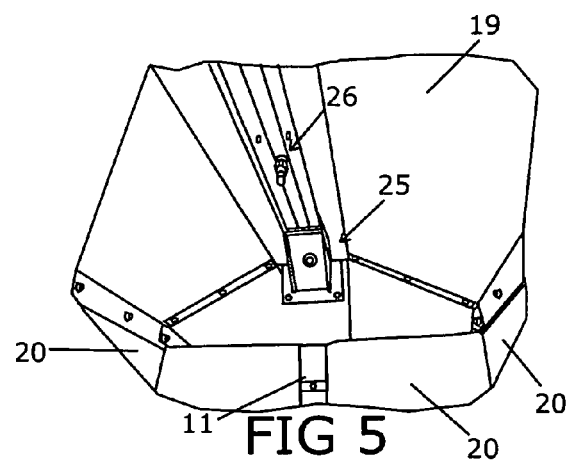
FIG. 5 is another perspective view showing the motion sensor and a spray nozzle beneath the spray hood structure of the spraying and feeding station of the invention.

Referring to FIGS. 4 and 5, the top hood structure 19 is shown to have motion sensor 25 and spray nozzles 26 mounted therein. The spray nozzles 26 are in fluid communication with the hose 24 extending from the pump/reservoir, as further discussed below. Further, flexible curtains 20 are shown extending downwardly from the hood top 19 so as to provide a protective area under hood top 19.

Figure 10:
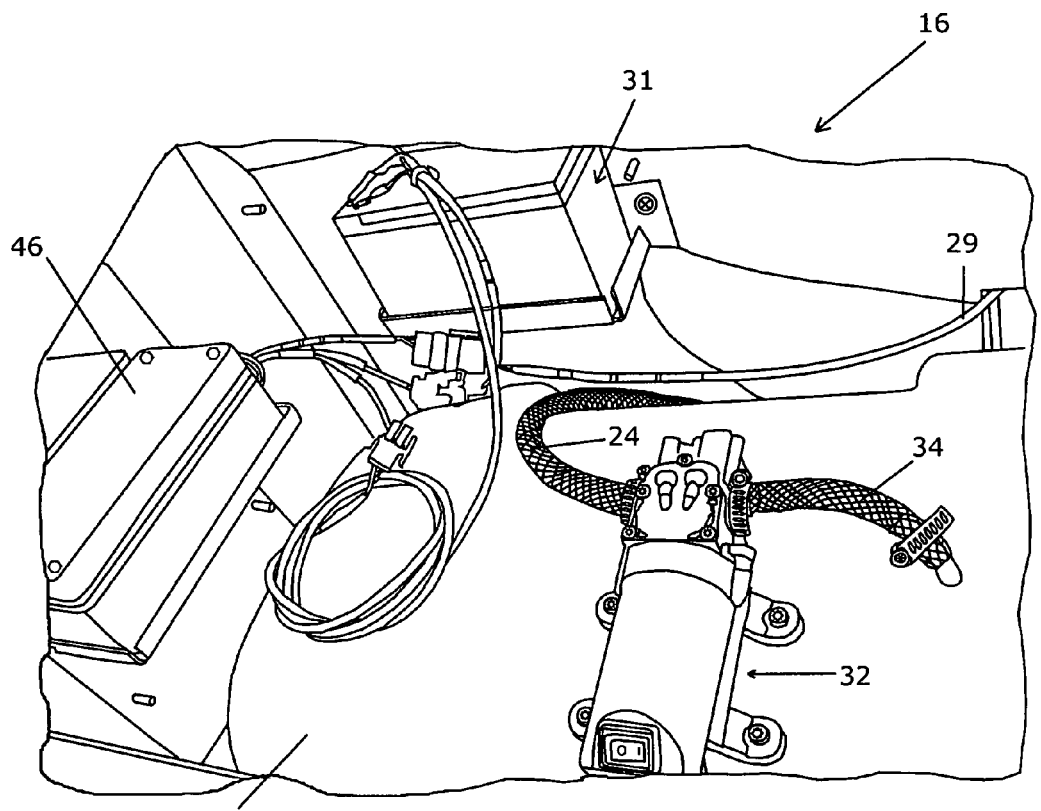
FIG. 10 is a perspective view showing the interior of the housing and the battery and pump and timing circuit assembly of the spraying and feeding station of the invention.
Figure 11:
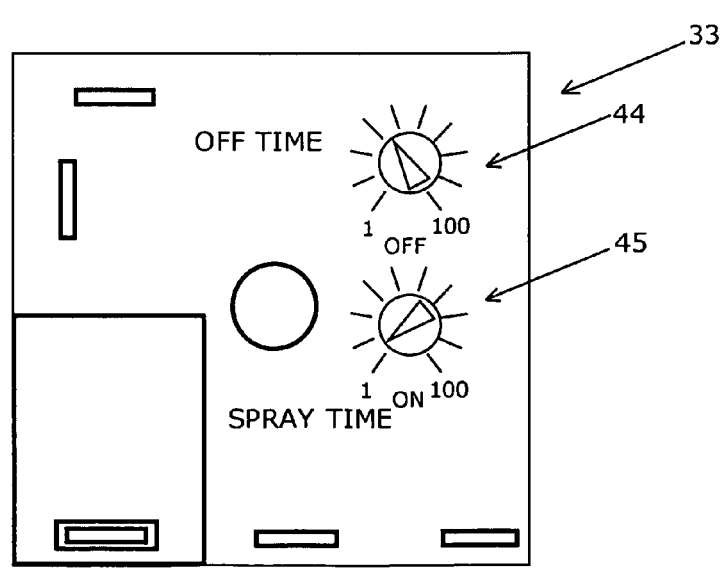
FIG. 11 shows the timer device utilized to control the spraying assembly of the invention.

Referring to FIGS. 10 and 11, the housing 16 is shown to contain battery 31, pump/motor assembly 32, reservoir 35 and a control box 46 in which timing circuit 33 is contained. The timing circuit has a timer with adjustment knobs which allows the pump/motor assembly to be operational for a predetermined time and which allows for setting a predetermined time between spray applications. Further, tubing 34 is shown interconnecting reservoir 35 and pump assembly 32 and hose 24 is shown extending from the housing to the spray nozzles 26 mounted in the spray hood structure 14.

FIG. 11 shows electric timer 33 which may be contained in control box 46 to have an off time setting 44 and a spray time setting 45. The off time setting 44 is utilized to set the desired time between spray cycles and may be adjusted between 1 to 100 seconds, for example. The on time setting 45 is utilized to set the desired time for the duration of the spray cycle and which may also be adjusted between 1 to 100 seconds, for example. As shown, the approximate settings would provide a spray cycle for 2-3 seconds at 40-50 second intervals while an animal is present at the mineral feeder as detected by the motion sensor.

Figure 6:
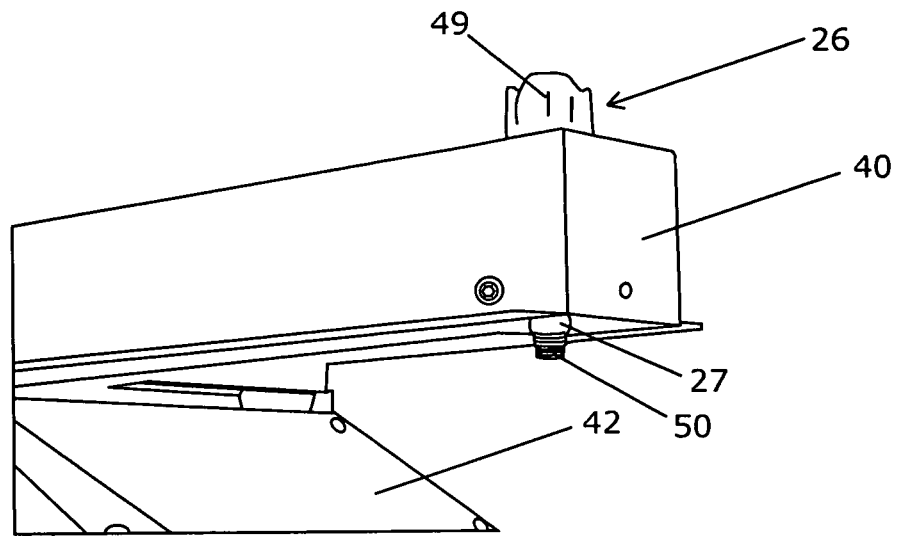
FIG. 6 is a perspective view showing a lateral housing extension of the spray hood structure.

As shown in FIG. 6, lateral housing extension 40 is shown to have a spray nozzle structure 26 mounted therethrough. The spray nozzle 26 has a nozzle body 27 having spray head 49 at the top and a spray tip 50 at the bottom. The spray head 49 may be loosened to allow air to be purged from the insecticide fluid system to thereby prime the spray system for operation.

An exemplary insecticide that may be utilized in the spraying station of the invention is Permectrin II, an emulsifiable insecticide spray containing 10% permethrin which may be used on beef cattle, dairy cattle, swine, horses, poultry and dogs and their premises. The insecticide provides a residual effect against various pests including flies, lice, mites, mosquitoes, fleas and ticks, including deer ticks which are carriers of Lyme disease. Permectrin II is a product of KMG Chemicals, Inc.

As many changes are possible to the spraying and feeding station of this invention utilizing the teachings thereof, the descriptions above and the accompanying drawings should be interpreted in the illustrative and not in the limited sense.

That which is claimed is:

1. A unitary, portable and automated fly and insect control assembly for large animals comprising:
    a) a frame structure having a base support and a support column mounted thereto and extending upwardly and vertically therefrom, said base support having a pair of opposing horizontally and outwardly extending leg members for ground surface contact to stabilize said unitary and portable structure in a large animal environment, said pair of opposing horizontally and outwardly extending leg members defining a pair of opposing quadrants, including a first quadrant and an opposing second quadrant;

b) a spray hood assembly mounted to said support column of said frame structure spatially and within said first quadrant, said spray hood assembly including a generally horizontally disposed cover assembly for controlling spray and covering the body of the large animal therebelow, said spray hood assembly further having opposing laterally extending housings;

c) a feeding structure mounted to said support column between said base support and said spray hood assembly, said feeding structure being in alignment and below said spray hood assembly and within said first quadrant;

d) a sensor to detect the movement of an animal approaching said feeding structure, said sensor being mounted within said cover assembly of said spray hood assembly;

e) a spraying assembly having a plurality of spray nozzles mounted in said cover assembly and a reservoir for an insecticide whereby said spraying assembly is activated when said sensor detects the presence of an animal at said feeding structure beneath said spray hood assembly, said plurality of spray nozzles being directed to spray the face and body of the large animals, said spraying assembly including one of said plurality of spray nozzles spray nozzle mounted in each said laterally extending housing to thereby provide spray coverage in said first quadrant; and f) a housing structure for containing said reservoir, said housing structure mounted to said support column of said frame structure opposite said spray hood assembly and said feeding structure and being spatially within said second quadrant, said housing structure having a bottom with a pair of elongated open slots therebelow constructed and arranged to receive the forks of a forklift for moving said unitary, portable and automated fly and insect control assembly, whereby the forks of a forklift are able to engage said elongated slots beneath said housing structure within said second quadrant and to move said unitary, portable assembly to another location for providing automated fly and insect control to the face and body of large animals.

2. The unitary, portable and automated fly and insect control assembly of claim 1, wherein said generally horizontally disposed cover assembly of said spray hood assembly includes opposing flexible curtains for protecting the spray from said spray nozzles and a frontal hood structure, said opposing flexible curtains to contain the spray within said horizontally disposed cover of said spray hood assembly.

3. The unitary, portable and automated fly and insect control assembly of claim 1, wherein said spraying assembly includes a power source, a timer and a pumping device.

4. The unitary, portable and automated fly and insect control assembly of claim 1, wherein said feeding structure includes a tray support and a tray.

5. The unitary, portable and automated fly and insect control assembly of claim 3, wherein said power source includes a battery and a solar panel.

6. The unitary, portable and automated fly and insect control assembly of claim 3, wherein said timer includes a spray on time control and a spray off time control.

7. A moveable, unitary spraying and feeding station comprising:

a) a frame structure having a base support and a vertical support member extending upwardly from said base support, said base support having four horizontally disposed openings and an upright stub, said horizontally disposed opening disposed below said upright stub, said upright stub being constructed and arranged to receive said vertical support member, and four leg extensions mounted in said horizontally disposed openings below said upright stub of said base support, whereby one of said leg extensions being mounted in one of each said horizontally disposed openings of said base support provides a stable frame structure, said four leg extensions forming four quadrants;

b) a spraying hood structure mounted to said vertical support member of said frame structure spatially above a first quadrant, said spraying hood structure having a generally horizontally disposed cover member with downwardly sloping sides and having a plurality of spray nozzles mounted therein, said spray nozzles directed to spray the face and body of an animal;

c) a feed holder mounted to said vertical support member of said frame structure below and in alignment with said spraying hood structure within said first quadrant;

d) a sensor within said spraying hood structure to detect the presence of an animal beneath said spraying hood structure within said first quadrant; and e) a housing mounted to said frame structure generally opposite said spraying hood structure and said feed holder and spatially within a second quadrant, said second quadrant being opposite said first quadrant, said housing containing a reservoir for holding an insecticide and a pump for spraying insecticide from said plurality of spray nozzles when said sensor detects the presence of an animal therein, said housing further having a timing circuit and a power source in communication with said pump, whereby the face and body of an animal is sprayed beneath said spraying hood structure for a predetermined time period when said sensor in said spraying hood structure is activated, said housing having a bottom with a pair of elongated open slots therebelow constructed and arranged to receive the forks of a forklift for moving said unitary, portable and automated fly and insect control assembly, whereby the forks of a forklift are able to engage said elongated slots beneath said housing structure within said second quadrant and to move said movable, unitary spraying and feeding station to another location for providing automated fly and insect control to the face and body of large animals.

8. The movable, unitary spraying and feeding station of claim 7, wherein said power source comprises a solar panel and a battery.

9. The movable, unitary spraying and feeding station of claim 7, wherein said spraying hood structure comprises a vertically adjustable top support member for supporting said horizontally disposed cover member and wherein flexible curtains are attached to said downwardly sloping sides of said cover member, said flexible curtains for protecting the interior environment of said spraying hood structure from the outside environment to thereby aid in directing spray from said spray nozzles to the face and body of an animal.

10. The movable, unitary spraying and feeding station of claim 7, wherein said reservoir contains an insecticide to kill back and face flies.

11. The movable, unitary spraying and feeding station of claim 7, wherein said feed holder is constructed to hold a mineral block, said feed holder comprising a generally rectangular feed structure and a tub for receiving the mineral block in said feed holder.

12. The movable, unitary spraying and feeding station of claim 7, wherein said frame structure, said feed holder and said housing are constructed of a heavy metallic material.

13. The movable, unitary spraying and feeding station of claim 7, wherein said feed holder and said housing have mounting tubes for adjustable vertical mounting to said support column of said frame structure.

14. A unitary automated, moveable and adjustable fly and insect control assembly for large animals comprising:
   a) a frame structure having a base support and a support column extending upwardly therefrom, said base support having leg members extending outwardly therefrom, said leg members being horizontally disposed and forming opposing quadrants including a first quadrant and a second quadrant;
   b) a spray hood assembly adjustably mounted with respect to said support column of said frame structure and being spatially above and within said first quadrant, said spray hood assembly comprising a generally horizontally disposed cover assembly, said spray hood assembly having a mounting tube for the adjustable mounting with respect to said support column to thereby allow vertical adjustment for the unimpeded entry of large animals beneath said horizontally disposed cover assembly spatially within said first quadrant;
   c) a feeding structure adjustably mounted with respect to said support column between said base support and said spray hood assembly, said feeding structure being adjustably mounted in vertical alignment with said cover assembly of said spray hood assembly and spatially within said first quadrant to provide unimpeded access for large animals;
   d) a sensor mounted within said cover assembly of said spray hood assembly to detect the movement of an animal approaching said feeding structure;
   e) a spraying assembly having a plurality of spray nozzles mounted in said spray hood assembly and having a reservoir for an insecticide whereby said spraying assembly is activated when said sensor detects the presence of an animal approaching said feeding structure beneath said spray hood assembly, said plurality of spray nozzles being directed to spray the face and body of a large animal; and
   f) said spraying assembly further having a power source, a timer and a pumping device, and wherein said power source includes a battery and solar panel, said solar panel being mounted on the top of said frame structure, said timer further including a spray on-time control and a spray off-time control.

15. The unitary automated and adjustable fly and insect control assembly of claim 14, wherein said cover assembly has a downwardly sloping hood top structure with opposing terminal edges and having opposing flexible curtains extending downwardly from said terminal edges of said sloping hood top structure.

16. The unitary automated and adjustable fly and insect control assembly of claim 14, wherein a containment housing is adjustably mounted to said support column for said reservoir, said containment housing being mounted opposite said feeding structure and spatially above said second quadrant.

17. The unitary automated and adjustable fly and insect control assembly of claim 16, wherein said timer, pumping device and battery are housed in said containment housing.

18. The unitary automated and adjustable fly and insect control assembly of claim 14, wherein said base structure of said frame structure has four leg members extending therefrom and wherein said leg members are removable from said base structure.

\* \* \* \* \*